United States Patent
Gordon et al.

(10) Patent No.: US 6,527,170 B1
(45) Date of Patent: Mar. 4, 2003

(54) ELECTROMAGNETIC POSTAL INDICIA AND METHOD OF APPLYING SAME

(75) Inventors: Roy A. Gordon, Gaithersburg, MD (US); Wayne A. Wilkerson, Fredericksburg, VA (US); Dan J. Lord, Upper Marlboro, MD (US)

(73) Assignee: United States Postal Service, Washington, DC (US)

( * ) Notice: Subject to any disclaimer, the term of this patent is extended or adjusted under 35 U.S.C. 154(b) by 183 days.

(21) Appl. No.: 09/714,848

(22) Filed: Nov. 16, 2000

Related U.S. Application Data (60) Provisional application No. 60/165,698, filed on Nov. 16, 1999.

(51) Int. Cl.⁷ .............................................. G06F 17/00
(52) U.S. Cl. ........................................ 235/375; 235/449
(58) Field of Search ............................... 235/360, 381, 235/462.01, 375, 472.01, 493, 494, 449; 229/92.8; 283/56; 40/711, 768

(56) References Cited

U.S. PATENT DOCUMENTS

| | | | | |
|---|---|---|---|---|
| 3,609,694 A | * | 9/1971 | Brenner et al. | 700/227 |
| 3,652,830 A | * | 3/1972 | Kessler | 235/487 |
| 3,774,758 A | * | 11/1973 | Sternberg | 209/3.3 |
| 3,884,370 A | * | 5/1975 | Bradshaw et al. | 198/350 |
| 3,895,220 A | * | 7/1975 | Nelson et al. | 235/493 |
| 4,051,913 A | * | 10/1977 | Gudea | 177/25.15 |
| 4,090,662 A | | 5/1978 | Fayling | 235/493 |
| 4,330,350 A | | 5/1982 | Andrews | 156/152 |
| 4,445,635 A | * | 5/1984 | Barr | 229/302 |
| 4,675,498 A | * | 6/1987 | Lemelson | 219/121.62 |
| 4,693,465 A | * | 9/1987 | Svyatsky et al. | 271/274 |
| 4,733,359 A | * | 3/1988 | Luperti et al. | 700/223 |

(List continued on next page.)

FOREIGN PATENT DOCUMENTS

| | | | |
|---|---|---|---|
| GB | 2 275 668 | * | 7/1994 |
| JP | 359149577 A | * | 8/1984 |

OTHER PUBLICATIONS

The United States Postal Service (USPS), Information–Based Indicia Program (IBIP), Performance Criteria for Information–Based Indicia and Security Architecture for Closed IBI Postage Metering Systems (PCIBI–C), Jan. 12, 1999.

The United States Postal Service (USPS), Information–Based Indicia Program (IBIP), Performance Criteria for Information–Based Indicia and Security Architecture for Open IBI Postage Evidencing System (PCIBI–O), Feb. 23, 2000.

*Primary Examiner*—Thien M. Le
(74) *Attorney, Agent, or Firm*—Leydig, Voit & Mayer, Ltd.

(57) ABSTRACT

Presented is a system and method of applying postage indicia to a mailpiece utilizing electromagnetic storage technology for the indicia. This method obviates the necessity of visual bar coded indicia, and greatly increases the amount of information which may be included in the postage indicia. This method also significantly reduces the physical space required on the face of a mailpiece to contain the postage indicia information, thus allowing the increased use of advertising and personal information and graphics on the mailpiece. The electromagnetic storage media may be in the form of a self-adhesive sticker or label, or may be integrated within the mailpiece or mailing label. Such integration may be accomplished through the use of embedded magnetic storage media, embedded ferromagnetic fibers, or the inclusion of ferromagnetic powder embedded in the mailpiece itself. Also provided is an apparatus for applying magnetically recordable media on a mailpiece. Such application may be in the form of a spray liquid, magnetic ink, rolled on impression, etc.

16 Claims, 3 Drawing Sheets

U.S. PATENT DOCUMENTS

| | | | | |
|---|---|---|---|---|
| 4,862,386 A | * | 8/1989 | Axelrod et al. | 707/507 |
| 4,885,459 A | * | 12/1989 | Norsworthy | 235/495 |
| 4,947,333 A | * | 8/1990 | Sansone et al. | 705/403 |
| 5,028,918 A | * | 7/1991 | Giles et al. | 340/10.51 |
| 5,166,676 A | * | 11/1992 | Milheiser | 340/10.34 |
| 5,291,002 A | * | 3/1994 | Agnew et al. | 235/375 |
| 5,491,471 A | * | 2/1996 | Stobbe | 340/5.61 |
| 5,590,912 A | * | 1/1997 | Stevens | 283/56 |
| 5,667,249 A | * | 9/1997 | Critelli | 283/70 |
| 5,699,956 A | * | 12/1997 | Brennan | 229/92.8 |
| 6,095,567 A | * | 8/2000 | Buell | 283/75 |
| 6,108,643 A | | 8/2000 | Sansone | 705/62 |
| 6,190,067 B1 | | 2/2001 | Kobayashi et al. | 400/207 |
| 6,237,837 B1 | * | 5/2001 | Martin | 229/71 |

* cited by examiner

ELECTROMAGNETIC POSTAL INDICIA AND METHOD OF APPLYING SAME

RELATED APPLICATION

This application claims the benefit of U.S. Provisional Application No. 60/165,698, filed Nov. 16, 1999.

FIELD OF THE INVENTION

This invention relates generally to postage indicia, and more particularly to the application of postage indicia through the use of electromagnetic encoding of a mailpiece.

BACKGROUND OF THE INVENTION

Postal authorities typically require that an amount of postage be paid for the processing of each mailpiece. Typically, and most often for individual personal use, the indication to the postal authority that the proper amount of postage has been paid is evidenced by the placement of a postage stamp on the actual mailpiece sent through the postal system. These postage stamps are sold in various denominations, and are typically applied to the mailpiece through an adhesive backing on the postage stamp. In this form, the postal authority requires a minimum amount of postage for a first class letter up to a certain weight, letters above which must include additional postage for proper processing.

To provide mailers with a more convenient method of evidencing postage the usage of postage meters has been authorized by the postal authority. While not in widespread usage among individual consumers, many businesses have acquired such postage meters to apply postage to the mailpieces sent therefrom. These postage meters print indicia as evidence of postage payment on the mailpieces themselves, or on adhesive labels which may be applied to the mailpieces to indicate to the postal authority that the proper amount of postage is affixed thereto. A benefit of the postage meters is that an exact amount of postage due for the processing of individual mailpieces of a particular weight may be dispensed by the postage meter, thus reducing the inclusion of excess postage on the individual mailpieces. This may result in a cost savings over the usage of traditional postage stamps.

A problem with the usage of conventional postage meters concerns the ability to counterfeit the postage impression. While certain information is contained in the postage indicia printed by the postage meter, such information can not necessarily ensure that counterfeiting of these indicia is not taking place. In an effort to curtail such counterfeiting, some postage meters utilize specially formulated inks when printing the indicia to inhibit the ability of postage counterfeiters from merely copying the printed indicia. However, these specially formulated inks are expensive, and have met with only limited success.

The postal authority has recently begun to allow use of a system of electronic postage purchasing, distribution, and printing, such system of electronic indicia based postage is conventionally known as the Information Based Indicia Program (IBIP). In brief, the IBIP system allows consumers to purchase and download postage from their PCs, and print a cryptographically-secured postal indicia on a mailpiece or adhesive label utilizing a standard computer printer. Various means of purchasing and downloading the postage have been proposed, including direct access via the Internet, through voice communication, via modem, smart card coding, etc.

IBIP is described in detail in the Information-Based Indicia Program Performance Criteria For Information-Based Indicia And Security Architecture For Open IBI Postage Metering Systems, published Mar. 11, 1999 by the United States Postal Service and available via the Internet at URL http://www.usps.gov/ibip/documents/specs/pcibi-625.pdf (the contents of which are hereby incorporated by reference in their entirety).

Presenting the Indicia as a Bar Code

When information-based indicia systems are used, it is helpful to provide the indicia in a machine-readable format. One way to accomplish this is through the use of bar codes. Unfortunately, such a system results in postage indicia that diminishes the aesthetic appearance of the mailpiece itself. Further, the resulting large postage indicia takes up valuable real estate on the face of the mailpiece that otherwise could be used for personalized or advertising messages and graphics from the business enterprise. Such large indicia also requires the usage of an excess amount of printer ink which, for business enterprises which generate large volumes of mail, increases the cost.

Further, bar code technology, while greatly improved from its first introduction, still suffers from a number of problems which hamper the ability of the postal authorities to efficiently and rapidly determine the authenticity of the postage indicia. Given the volume of mailpieces which the postal authority processes each day, high speed sorting and reading machines are required. Unfortunately, many factors combine to reduce the rate at which bar code equipment can process mailpieces, leading to unnecessary and unacceptable delays in the processing of the mail. Moreover, the technology for scanning bar codes is expensive and not completely reliable. Further, any physical manipulation of the printed indicia, such as may result from dirt, smudges, and decreased resolution resulting from the use of colored or patterned envelopes significantly impacts the accuracy and bar code scanning.

It is therefore a need in the art to provide a system of applying postage indicia to mailpieces which does not rely upon visual bar coded data which relies on optical scanning system technology to read and process this indicia. Such a system is presented by the instant invention.

SUMMARY OF THE INVENTION

In view of the above it is an object of the instant invention to provide a new and improved system and method for indicating on a mailpiece that a proper amount of postage is associated therewith. It is an additional object of the instant invention to provide a new and improved system of verifying a proper amount of postage is affixed to a mailpiece. Additionally, it is an object of the instant invention to provide this system and method without the use of optical indications such as bar codes or other optical images which must be read using optical scanning technology. It is a further object of the instant invention to reduce the optical images required to be printed on a mailpiece to indicate proper postage so as to make available additional real estate on the face of a mailpiece for inclusion of advertising verbiage and images, as well as personal messages and graphics.

In view of these objects, it is a feature of the instant invention to provide proper indication of postage on a mailpiece via electromagnetic encoding. It is an additional feature of the instant invention that such encoding may be affixed to the mailpiece or may be incorporated as part of the mailpiece. It is a further feature of the instant invention that this method be accommodated on a mailpiece through specially manufactured envelopes having ferromagnetic fibers or other magnetic storage media embedded therein for retaining the electromagnetic postage information. Alternatively, it is the feature of the instant invention to provide adhesive labels which are capable of storing electromagnetic information which may be applied to a mailpiece.

Further, it is a feature of the instant invention to provide a postage meter which applies an electromagnetic information storage element onto a conventional mailpiece, and which further encodes the electromagnetic storage element with proper postage information without the use of bar codes. The electromagnetic information storage material may be in the form of ferromagnetic ink or other ferromagnetic liquid mixture which may be sprayed, rolled, or otherwise applied to a conventional mailpiece. Further, it is a feature of the instant invention that a mailpiece mailing label or envelope may be made with ferromagnetic powder integrated with the fibers or other material therein to produce a mailpiece label or envelope which is itself electromagnetically encodeable.

In view of these objects and features, it is an aspect of the instant invention that the physical size of the encoded indicia may be greatly reduced from the requirements of visual bar coding the same amount of data. It is a further aspect of the instant invention that a vastly greater amount of data may be included in the postage indicia without excluding real estate that may be used for advertising and personalized information and graphics. It is an additional aspect of the instant invention that the electromagnetically encoded indicia may be printed over with visual information without degradation of the postage indicia.

Other objects and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

With the above description of the current state of the art of postage indicia firmly in mind, direction is now focused on a description of the figures that will provide exemplary embodiments of the instant invention, aiding a thorough understanding thereof. It is noted that these figures and the following description of the exemplary embodiments of the instant invention are provided by way of example, and not by way of limitation. Therefore, as will be understood by one skilled in the art, the full measure of the scope of the instant invention encompasses numerous alternative embodiments as will be understood from the following description and the scope of the appended claims. Explicit reservation of these numerous alternative embodiments is respectfully maintained.

As described above, modem electronic postage indicia occupies increasingly large areas of real estate on a mailpiece. This large area is necessitated by the current state of the art utilizing bar code technology to scan the bar coded indicia utilized on the mailpieces in the postal system. Specifically, in order to reduce and deter the occurrence of counterfeiting, modem electronic postage indicia may utilize cryptographic techniques to encode this data. This encoded data is then bar coded and applied to the face of the mailpiece as described above. As recognized by the inventors of the instant invention, the amount of information necessary to be contained in a bar coded postage indicia to achieve the level of assurance against counterfeiting necessary to make such indicia practical and the necessary resolution of this bar coded indicia required by the optical scanning technology necessarily results in a large postage indicia occupying a substantial amount of real estate on the mailpiece.

Figure 1:
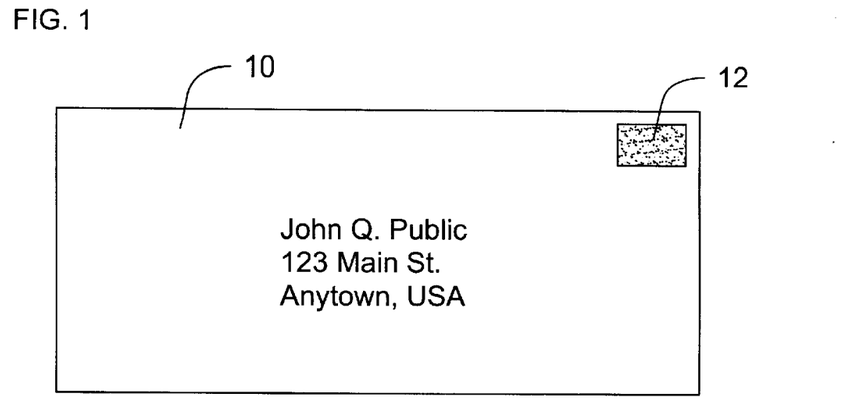
FIG. 1 is a simplified illustration of a mailpiece incorporating an embodiment of the instant invention thereon.

To overcome these problems, the instant invention utilizes electromagnetic data storage technology on the mailpiece to store the required information for a postage indicia. An exemplary embodiment of such a mailpiece incorporating the teachings of the instant invention is illustrated in FIG. 1 to which specific reference is now made. As illustrated in this FIG. 1, a typical mailpiece 10, in the form of a letter, is illustrated containing a relatively small electromagnetically recordable area 12 which may be magnetically encoded to contain all of the information necessary to authenticate the postage and prevent or significantly reduce counterfeiting thereof. As will be recognized by one skilled in the art, the amount of information which may be stored utilizing current electromagnetic information storage technology is more than adequate to store the amount of information necessary for such indicia. In fact, modem magnetic storage media has achieved a greater than 1 Gbit/in$^2$ storage density for some applications (IBM has demonstrated the feasibility of storing information at 3 Gbit/in$^2$). This translates to the equivalent of about 50,000 pages of text on one square inch. With this capacity for information storage, the information included in the indicia may be increased to greatly reduce or eliminate the probability of counterfeit indicia.

Further, even if the area required to store the necessary information were equal to or in excess of the area necessary using visual bar coded optical scanning system technology, the system of the instant invention would still allow advertising verbiage, illustrations, and personalized information to be printed on the mailpiece. This benefit is achieved since the electromagnetic encoding does not necessarily have a visual component to it, allowing printing of the visual information over (or under) the magnetically encoded postage indicia. In other words, both visual information and electromagnetic information may occupy the same physical space without interference therebetween. Therefore, the advertising verbiage, graphics, or personalized information could be printed directly over or integrated with the electromagnetically stored information on the mailpiece. The integration of both visual and electromagnetic information may be obtained through the use of, for example, magnetic ink which may be utilized to print a full color illustration in area 12 visually displaying the advertising or personalized information and containing electromagnetically coded postage indicia information for use by the postal authorities in authenticating the postage for the mailpiece.

Figure 2:
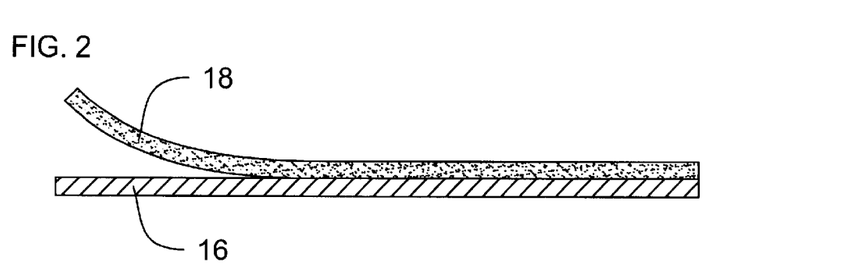
FIG. 2 is a partial cross sectional illustration of a ferromagnetic adhesive label, which may be applied to a mailpiece in accordance with the teachings of the instant invention.

In addition to the amount of information which may be stored, the current state of the art for electromagnetic storage media has produced significant advances in both the material properties, including flexibility, as well as the ability to maintain the fidelity of the information encoded thereon. In an embodiment of the instant invention, a flexible electromagnetic encodeable sticker or self-adhesive stamp or label 14 may be provided. This magnetizable layer 14 may be removed from its backing layer 16 and applied to the mailpiece for deposit into the postal system. This sticker 14 comprises a magnetizable layer preferably containing ferromagnetic pigments or metallic powder having iron (FE) as a main component. This layer may also be a common particulate recording media utilizing $\gamma\text{-Fe}_2\text{O}_3$, Co surface-modified $\gamma\text{-Fe}_2\text{O}_3$, $\text{CrO}_2$, and metal particle media. Thin film media may also be used.

Various binding agents may be utilized in layer 14 as are known in the art to result in a flexible layer 14. Such binding agents may include, for example, vinyl chloride resin, hydrophilic resin, and polyurethane resins, to name only a few of the acceptable and well known binding agents in the construction of electromagnetically recordable media. The label 14 may have one or multiple recording tracks as is known in the art. Once the flexible magnetically encodeable layer 14 is applied to a mailpiece, the mailpiece itself serves to form a non-magnetizable substrate for the magnetizable layer 14 which, as is recognized in the art, enhances the fidelity of the electromagnetic encoding.

Figure 3:
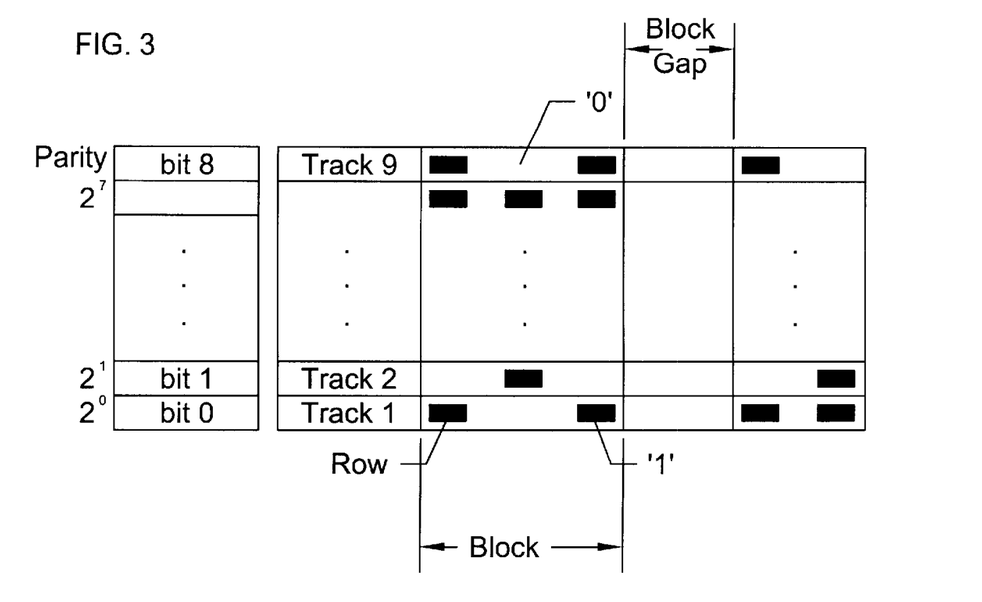
FIG. 3 is a simplified schematic diagram illustrating a typical magnetic encoding format applicable to the system of the instant invention.

A typical encoding configuration applicable to the instant invention is illustrated in simplified schematic form in FIG. 3. The configuration illustrated in this FIG. 3 is similar to that generally utilized in both reel to reel and cartridge magnetic storage tapes having nine separate tacks across the tape. The number of tracks actually utilized for any particular embodiment of the instant invention may vary from this conventional number, and may be organized wholly differently from this typical magnetic tape type configuration. For such an embodiment, however, each track requires its own read and write head operated independently from the other tracks. Typically, tracks 1–8 are used for data storage, and track 9 is used for the parity bit. Data is written on the magnetic storage media in rows of magnetized islands, using for example, EBCDIC (Extended Binary Coded Decimal Interchange Code).

Figure 4:
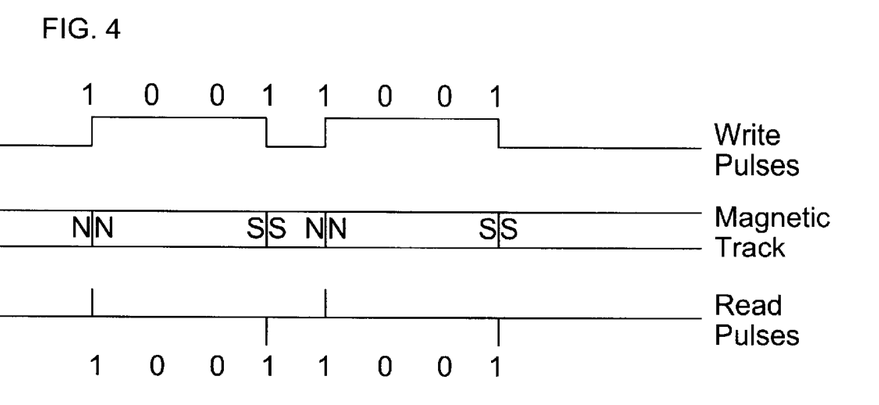
FIG. 4 is a simplified digital signal diagram illustrating bit sequences recorded on a magnetic storage media applicable to an embodiment of the instant invention.
Figure 8:
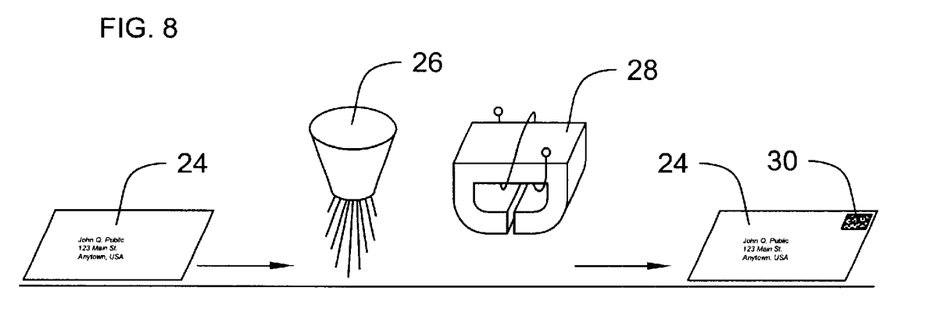
FIG. 8 is a simplified schematic illustration of a postage meter which applies a ferromagnetic material and then encodes this material on a standard mailpiece in accordance with the teachings of the instant invention.

As will be recognized by those skilled in the art, encoding the magnetic storage material is accomplished with a write head as will be illustrated and discussed with regard to FIG. 8. The writing head is concerned with converting an electrical pulse into a magnetic state and can be magnetized in one of two directions. This is done by passing a current through the magnetic coil which sets up a leakage field across a gap existing in the write head. When the current is reversed, the field across the gap is changed, reversing the plurality of the magnetic field on the tape. The head magnetizes the passing magnetic storage media, recording the state of the magnetic field in the air gap. A logic 1 is recorded as a change in polarity on the tape, and a logic 0 is recorded as no change in polarity, as illustrated in FIG. 4. Reading the magnetic storage material at the postal authority from the magnetic storage media and converting them to electrical signals is done by a read head as is known in the art. The bit sequences illustrated in FIG. 4 show the change in magnetic states on the storage media. When the mailpiece having the storage media incorporated thereon is passed over a read head, it induces a voltage into the magnetic coil of the read head which is converted to digital levels to retrieve the original data, as is conventional.

Figure 5:
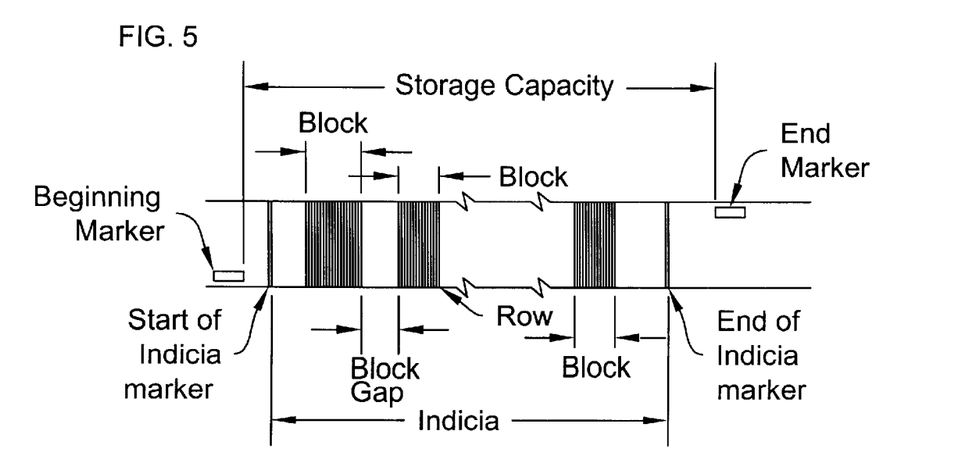
FIG. 5 is a simplified coherent sequence diagram illustrating magnetic storage media formatting applicable to an embodiment of the instant invention.

Typically, information is stored on the magnetic media in the form of a coherent sequence of rows forming a block. This block may correspond to an element of the postage indicia, or to the entire indicia itself depending upon the level of complexity and amount of information provided therein. This block is typically the minimum amount of data written to or read from the magnetic storage media. Each block of data is typically separated by a block gap which is an area of the magnetic media having no data stored thereon. As illustrated in FIG. 5, the postage indicia may comprise multiple blocks of data depending upon the requirements of the system, and is typically contained between a start of indicia marker and an end of indicia marker existing within the beginning marker and end marker of the magnetic storage media. However, such beginning and ending markers are not necessarily required, and may be dispensed with.

The actual method of recording the postage indicia information on the magnetic storage media is not necessarily limited to any particular method. There are several recording modes that are used with the express objective of storing data at the highest density and with the greatest reliability of noncorruption of the retrieved data available. Two popular but contrasting modes are the non-return-to-zero (NRZ) and phase encoding (PE) modes. The NRZ technique is illustrated in FIG. 4, where only the "1" bit is displayed by the reversal of magnetization on the recording media. The magnetic polarity remains unchanged for logic "0". An external clock track is also required for this mode because a pulse is not always generated for each row of data on the storage media. The PE technique allows both the 0 and 1 states to be displayed by changes of magnetization. A 1 bit is given by a north-to-north to pole on the storage media, and a 0 bit is given by a south-to-south pole on the media. PE provides approximately double the recording density and processor speed of NRZ. Magnetic media recorded using the PE technique carries an identification mark called a burst, which consists of successive magnetization changes at the beginning of track number 4. This allows the reading machinery to recognize the tape mode and configure itself accordingly.

As mentioned briefly above, layer 14 of FIG. 2 may contain a visual image on the outer surface thereof, preprinted or printed at the time of application to a mailpiece. In the first instance, the stickers 14 may be provided with customized business logo or advertising information, personalized information, or artistic illustrations to enhance the visual impact of the mailpiece in much the same way that designer postage stamps do currently. However, unlike current postage stamps, the images which may be printed on these electromagnetically recordable media 14 may be customized to a particular business or individual through third-party vendors since the application of postage value to this layer 14 is preferably not added until the time of posting the mailpiece. In the latter, the layer 14 may have a blank surface onto which a business or individual may print advertising, personal, etc. information before, after, or at the time of posting.

Figure 6:
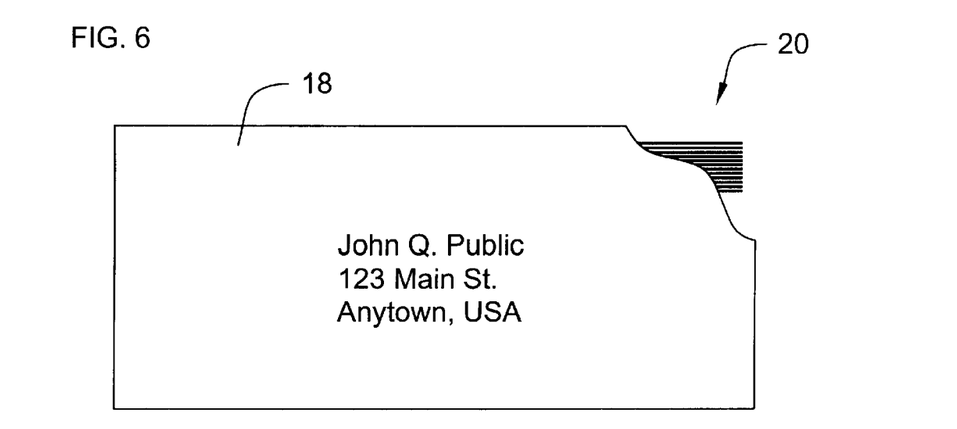
FIG. 6 is a simplified illustration of an envelope containing ferromagnetic fibers in accordance with the teachings of the instant invention.

As an alternate embodiment of the instant invention, the electromagnetic encoding of the postage information may be retained by a mailpiece 18 through the inclusion of ferromagnetic fibers 20 within the mailpiece or mailing label affixed to a mailpiece as illustrated in FIG. 6. These impregnated ferromagnetic fibers 20 may be contained in the entire mailpiece envelope or mailing label, or may be positioned only in the correct physical location expected for postage information to be stored on the mailpiece. This area is typically the upper right hand corner of a business envelope, for example. Through the use of these impregnated ferromagnetic fibers 20, the face of the mailpiece may be used exclusively for recipient address information and personalized, advertising, decorative, etc. information.

However, additional information may be placed on the mailpiece, including a visual indication of the amount of postage encoded for the mailpiece so that the letter carriers may have some indication that postage has been applied to the mailpiece. While the illustration of FIG. 6 depicts the ferromagnetic fibers 20 oriented in a relatively horizontal parallel configuration, it is envisioned that other orientations may be appropriate as well. For example, the fibers may be oriented in a generally vertical orientation, a grid type pattern of fibers, or possibly simply a random orientation of the ferromagnetic fibers within at least the appropriate area of the mailpiece.

Figure 7:
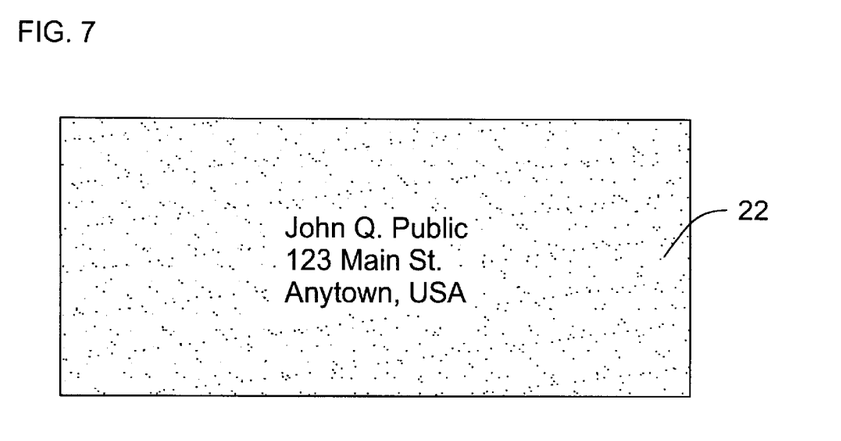
FIG. 7 is a simplified illustration of an envelope having ferromagnetic powder incorporated into the fibers thereof in accordance with the teachings of the instant invention.

A further alternate embodiment of the instant invention utilizes a mailpiece or mailing label 22 which has been impregnated with ferromagnetic powder as illustrated in FIG. 7. This impregnation may be throughout the envelope or mailing label 22, or may be simply contained in an area appropriate for placement of postage information, typically in the upper right hand corner of the mailpiece. As with the previous embodiments, this embodiment 22 allows the entire surface area of the mailpiece or mailing label 22 to be utilized for recipient address, advertising, personalized, or graphic information. The actual encoding of the postage information is contained within the magnetizable envelope or mailing label itself.

As indicated briefly above, the magnetizable layer which is encoded with the postage information may be applied in the form of magnetic ink, or other liquid form to the mailpiece and then encoded thereafter. FIG. 8 presents a simplified schematic illustration of such a process whereby a mailpiece 24 enters an apparatus which first sprays at nozzle 26 the ferromagnetic liquid (ink or otherwise) on the appropriate portion of the mailpiece 24. While a spraying technique is illustrated in FIG. 8, those skilled in the art will recognize that other techniques for applying liquid materials to a substrate, including rolling techniques similar to those utilized in conventional postage meters to apply the metering information to a mailpiece may also be used. It will also be recognized that a single or multiple tracks may be applied in this way. Once the ferromagnetic layer has been applied, the mailpiece is then encoded via an electromagnetic encoding apparatus 28 as is known in the art. Once the mailpiece 24 has been through this process, it is ready for placement into the postal system, having the requisite postage information electromagnetically encoded at least in an area 30 appropriate and required by the postal system.

This process as illustrated in schematic form in FIG. 8 may take place within a single apparatus similar to conventional postage meters, or may take place in two or more separate machines as desired. In such a configuration, one machine may be utilized to apply the magnetic storage material on the mailpiece or mailing label, and a separate machine used to encode the postage indicia. This allows third party mailpiece vendors (makers of envelopes and mailing labels) to supply recordable mailpieces to a business. The business would then only need to encode these mailpieces with the requisite postage indicia with a recording device 28.

While not specifically illustrated in the schematic diagram of FIG. 8, one skilled in the art will recognize that an additional visual printing stage may be included to print visual information to be contained on the mailpiece. Such information may include the recipient address, advertising verbiage, logos, personalized messages, or other artwork as desired. This printing stage may take place either before or after the electromagnetic encoding of the postage information via encoder 28. The printing of visual information may be accomplished via a standard stand-alone printer, and need not be integrated with the electromagnetic encoding device 28, although such integration is within the scope of the instant invention.

Numerous modifications and alternative embodiments of the invention will be apparent to those skilled in the art in view of the foregoing description. Accordingly, this description is to be construed as illustrative only and is for the purposes of teaching those skilled in the art the best mode for carrying out the invention. The details of the structure may be varied substantially without departing from the spirit of the invention, and exclusive use of all modifications that come within the scope of the appended claims is reserved.

We claim:

1. A mailpiece comprising an envelope that is itself electromagnetically encodeable to include postage indicia thereby eliminating a need to affix a postage stamp on said envelope to evidence such postage.

2. The mailpiece of claim 1, wherein said envelope includes ferromagnetic fibers embedded therein, said ferromagnetic fibers retaining said electromagnetically encoded postage indicia.

3. The mailpiece of claim 1, wherein said envelope includes ferromagnetic power integrated within fibers of said envelope thereby allowing said envelope itself to be electromagnetically encodeable.

4. The mailpiece of claim 1, further comprising a visual illustration placed thereon, and wherein at least a portion of said visual information occupies a surface area of said mailpiece containing said electromagnetically encoded postage indicia.

5. A mailing label for use on a mailing container, comprising:
    a flexible magnetizable layer having an outer surface on which at least recipient address information may be printed, said flexible magnetizable layer being electromagnetically encodeable to include postage indicia thereby eliminating a need to affix postage stamps on the mailing container to evidence such postage; and
    a layer of adhesive on one side of said flexible magnetizable layer.

6. The mailing label of claim 5, wherein said flexible magnetizable layer comprises ferromagnetic pigments in a flexible binding agent.

7. The mailing label of claim 6, wherein said binding agent is selected from the group consisting of vinyl chloride resin, hydrophilic resin, and polyurethane resins.

8. The mailing label of claim 5, wherein said flexible magnetizable layer comprises metallic power in a flexible binding agent.

9. The mailing label of claim 5, wherein said flexible magnetizable layer comprising a particulate recording media utilizing one of the group consisting of $\gamma\text{-}Fe_2O_3$, Co surface-modified $\gamma\text{-}Fe_2O_3$, $CrO_2$, and metal particle media.

10. The mailing label of claim 5, further comprising a removable non-magnetizable backing layer.

11. The mailing label of claim 5, wherein said flexible magnetizable layer comprises a plurality of recording tracks formed thereon.

12. The mailing label of claim 5, wherein said flexible magnetizable layer includes a visual image on said outer surface thereof.

13. A method of applying electromagnetic postal indicia to a mailpiece, comprising the steps of:

applying ferromagnetic ink to the mailpiece itself;

electromagnetically encoding the ferromagnetic ink with information evidencing proper postage thereby eliminating a need to affix postage stamps to the mailpiece to evidence such postage.

14. The method of claim 13, wherein said step of applying ferromagnetic ink to the mailpiece comprises the steps of:

passing the mailpiece under a print head; and spraying the ferromagnetic ink onto the mailpiece.

15. The method of claim 13, wherein said step of applying ferromagnetic ink to the mailpiece comprises the steps of:

passing the mailpiece under a print head; and rolling the ferromagnetic ink onto the mailpiece.

16. The method of claim 13, wherein said step of electromagnetically encoding comprises the step of electromagnetically encoding a plurality of tracks of information.

* * * * *

UNITED STATES PATENT AND TRADEMARK OFFICE
CERTIFICATE OF CORRECTION

PATENT NO. : 6,527,170 B1
DATED : March 4, 2003
INVENTOR(S) : Roy R. Gordon et al.

It is certified that error appears in the above-identified patent and that said Letters Patent is hereby corrected as shown below:

<u>Title page,</u>
Item [75], 2$^{nd}$ inventor should read -- Roy R. Gordon --.

Signed and Sealed this

Fifth Day of August, 2003

JAMES E. ROGAN
*Director of the United States Patent and Trademark Office*